(No Model.)
L. L. BURDON.
MANUFACTURE OF SEAMLESS COMPOUND INGOTS AND WIRE
MADE THEREFROM.
No. 460,108. Patented Sept. 29, 1891.
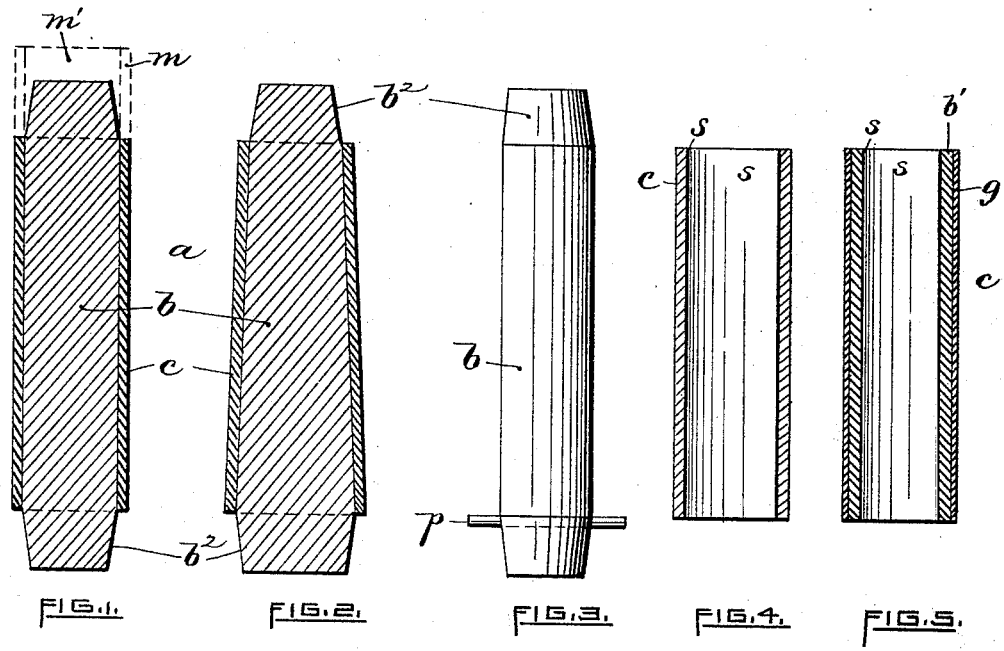
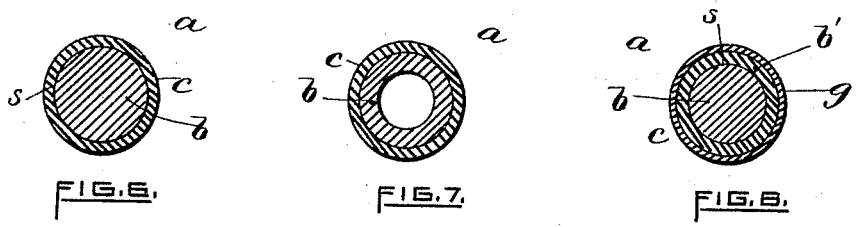
WITNESSES.
Charles Hannigan
Herbert F. Fourtellot.
INVENTOR.
Levi L. Burdon.
by Remington & Hawthorn
Attys.

UNITED STATES PATENT OFFICE.

LEVI L. BURDON, OF PROVIDENCE, RHODE ISLAND, ASSIGNOR TO THE BURDON SEAMLESS FILLED WIRE COMPANY, OF SAME PLACE.

MANUFACTURE OF SEAMLESS COMPOUND INGOTS AND WIRE MADE THEREFROM.

SPECIFICATION forming part of Letters Patent No. 460,108, dated September 29, 1891.

Application filed March 15, 1890. Serial No. 344,010. (No model.)

*To all whom it may concern:*

Be it known that I, LEVI L. BURDON, a citizen of the United States, residing at Providence, in the county of Providence and State of Rhode Island, have invented certain new and useful Improvements in the Manufacture of Seamless Compound Ingots and Wire Made Therefrom; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In the production of seamless compound ingots, particularly when reduced to wire, I have sometimes found that the amount of solder used for uniting the gold shell or outer portion to the inner or core portion of baser metal bears too great a proportion or percentage of the whole ingot, even though the solder itself is rolled down as thin as practicable and inserted between the surfaces of the shell and core in the form of a continuous sheet before fusing.

The object of my present invention is to produce ingots (and wire) of the class just referred to in which the amount of solder employed is reduced to a minimum.

To that end my invention consists in applying the solder to the interior surface of the gold shell. This is done by fusing a film of suitable solder over the entire surface of one side of a comparatively thick disk or flat piece of metal, as gold or even plated stock, after which the solder-covered gold or stock is rolled down until the desired thickness of metal is attained. The piece of stock is then gradually transformed into a seamless tubular form, at the same time elongating it, and consequently reducing the diameter of the tube. When the tube has reached the proper size, its interior surface will be found to be completely covered with a very thin layer or film of solder, much thinner, in fact, than could be practically applied otherwise.

In making compound ingots I take a piece of base metal of suitable form and size and prepare its surface with borax. I next insert it into the solder-lined seamless shell or tube of gold, the two snugly fitting together, after which the whole is subjected to a suitable degree of heat, which fuses the solder and unites the shell to the core. The ingot is then adapted to be reduced to seamless compound wire. In some of my former patents are described ways of making compound wire, as, for example, United States Patents No. 294,722, dated March 4, 1884, and No. 381,527, dated April 24, 1888.

In the appended drawings, Figure 1 is a sectional view taken longitudinally through the center of my improved compound ingot. Fig. 2 is a similar view of an ingot, one end of the ingot being larger than the other, or tapering. Fig. 3 is a side view of the base-metal-core portion. Fig. 4 is a longitudinal sectional view of the seamless solder-lined gold shell or tube adapted to be soldered to the core. Fig. 5 is a similar sectional view of a solder-lined compound shell—that is, a gold-plated tube having a thin layer of solder covering its inner surface. Fig. 6 is a transverse sectional view of an ingot having a solid core united to the solder-lined gold shell. Fig. 7 is a similar view of an ingot having a hollow core. Fig. 8 is a cross-sectional view of an ingot having a plated solder-lined shell united to a base-metal core; and Fig. 9 represents, in partial section, a piece of wire reduced from my improved ingot.

In the drawings, $a$ designates my improved ingot or wire as a whole. The ends $b^2$ of the core portion of the ingot may be extended to facilitate the entrance of the ingot between reducing-rolls or other mechanism used for transforming ingots to wire.

The surface of the ingot consists of a seamless shell $c$ of alloyed gold soldered to the core. Other metals, however, may be substituted for the gold. In producing the shell the metal is cast or rolled out in the form of a flat sheet having considerable thickness, after which one of its surfaces is covered with solder. After fusing the solder over said surface the metal is next greatly reduced in thickness, thereby at the same time relatively reducing the thickness of the coating of solder. Now a disk or blank cut therefrom may by the use of suitably-operating plungers and dies be drawn to a tube form, having a tapering, cylindrical, or other shape cross-sectionally, the inner surface being lined with the thin unbroken film of solder s. The thickness of solder, as represented in the drawings, is greatly exaggerated. So, also, are the walls of the shell itself made somewhat thicker than would be used in ordinary practice. The core portion b, which is made of base or plating metal usually, is turned off, so as to just fit the interior of the outer shell c. It may be tapering, as shown in Fig. 2, and having the ends $b^2$ extending beyond the shell, as before stated. The shell may be prolonged or extended, as indicated by dotted lines at m, Fig. 1, for the purpose of forming a chamber or reservoir m'. This chamber is for holding loose solder. In uniting or soldering the shell to the core one or both of the adjacent surfaces are suitably prepared and covered, say, with borax to promote the fusion of the solder. The core b is next inserted into the tube, a pin p fitted into the core serving to prevent the shell from dropping off during the soldering operation, the whole being next subjected to the action of heat exceeding the fusing-point of the solder. I would state that in case additional solder may be required from any cause it can be supplied from the chamber m'. The parts may be suspended vertically in a suitable furnace and revolved while being acted upon by the heat in order to receive a more uniform treatment. This manner of producing seamless compound ingots by the employment of solder-lined shells c results in a much better grade or quality of seamless compound wire, because by it the quantity of solder used may be reduced to a minimum.

A serious objection to the use of some forms of seamless soldered wire as heretofore made, wherein the solder uniting the gold and core has considerable thickness, is that in making, say, rings, chain-links, and other articles therefrom which are to be united at the abutting ends, it is found, particularly when the gold covering is quite thin, upon subjecting the joint to the influence of heat sufficient to fuse the additional solder placed on the joint, as common in uniting such annular articles, that the solder from the interior of the wire adjacent to the cut portion melts and runs out, thereby producing a slight cavity between the core b and seamless gold shell c. This cavity in the process of soldering the joint is not uniformly refilled by the joint-solder, so that the wire at the joint is irregular, sometimes being a little smaller than the normal diameter and sometimes a little larger. In order to overcome this defect, the workman must possess considerable skill to so finish the joint that it will not be readily detected. In case the abutting ends of the gold shell become expanded such expanded portion must be removed, thereby making the gold very thin, if not entirely cutting through it. In the latter event the article cannot be used. Sometimes the shell of gold at the ends of the ring or link, if quite thin, becomes crimped or wrinkled when subjected to heat during the process of soldering the joint, thereby obviously rendering the article unsuitable for use.

By the employment of wire having the seamless gold shell united to the core according to my present improvement the thickness of the solder film is reduced to a minimum. Therefore the objections before referred to as inherent in soldered seamless wire are essentially overcome, and at the same time the percentage of imperfect work due to the causes above named is practically of no moment.

In lieu of the solder-lined gold shell c shown in Figs. 1, 2, 4, 6, and 7, the shell may be produced from flat plated or compound stock by fusing solder over the reverse or exposed base-metal surface, and then by suitable rolls and dies transforming the piece of stock to a tubular form, as shown in Fig. 5, wherein the shell c has a seamless exterior portion g of gold united or welded to an inner base-metal portion b', the latter having its inner surface covered with a minute film of solder s. This solder-lined compound shell may be soldered to a solid base-metal core b, substantially as shown by Fig. 8, or the core may be annular, as shown in Fig. 7.

I claim—

1. The improvement in the manufacture of seamless compound ingots and wire, the same consisting in fusing a film of solder over the surface of one side of a flat piece of fine metal or plated stock, then by suitable rolls and dies transforming the blank to a seamless tube having the solder on the inside, then inserting a suitably-prepared core of base metal into the said tube, then subjecting the whole to a suitable temperature to re-fuse the solder lining of the shell, thereby uniting the shell and core, and then reducing the ingot to wire.

2. The improved process for making seamless plated stock, the same consisting in forming a plate, one side of which is covered with solder, into a seamless tube, inserting a core into the tube, and uniting the two together by melting the solder.

In testimony whereof I have affixed my signature in presence of two witnesses.

LEVI L. BURDON.

Witnesses:
CHARLES HANNIGAN,
GEO. H. REMINGTON.